United States Patent

Bud et al.

Patent Number: 5,883,922
Date of Patent: Mar. 16, 1999

[54] FSK COMMUNICATION DEVICE FOR DIGITAL INFORMATION

[75] Inventors: Andrew Bud, Ivrea; Luciano Campi, Favaro; Franco Straullu, Ivrea, all of Italy

[73] Assignee: Olivetti Telemedia S.p.A., Ivrea (TO), Italy

[21] Appl. No.: 537,689

[22] PCT Filed: May 5, 1994

[86] PCT No.: PCT/EP94/01426

§ 371 Date: Oct. 27, 1995

§ 102(e) Date: Oct. 27, 1995

[87] PCT Pub. No.: WO94/27392

PCT Pub. Date: Nov. 24, 1994

[30] Foreign Application Priority Data

May 12, 1993 [IT] Italy ................................. T093 A 0330

[51] Int. Cl.⁶ .............................. H04B 1/38; H03C 3/06; H03D 3/00; H03D 1/02
[52] U.S. Cl. ........................... 375/223; 375/306; 375/334; 375/343
[58] Field of Search ...................................... 375/295, 302, 375/303, 309, 313, 307, 272, 278, 222, 219, 220, 223, 306, 334, 335, 343, 322; 331/177 R, 179, 173; 382/100, 102; 330/10

[56] References Cited

U.S. PATENT DOCUMENTS

| 3,803,354 | 4/1974 | Bennett | 375/272 |
| 4,311,971 | 1/1982 | La Rosa | 332/100 |
| 4,368,439 | 1/1983 | Shibuya et al. | 332/100 |
| 4,682,344 | 7/1987 | Somer | 375/62 |

OTHER PUBLICATIONS

IBM Technical Disclosure Bulletin., vol. 13, No. 10, Mar. 1971, New York US, pp. 2912–2913, A. Croisier et al. "Frequency–Shift Signal Generator".

Electronics & Wireless World, vol. 92, No. 1610, Dec. 1986, Surrey GB, p. 95, "Working Both Ways".

*Primary Examiner*—Chi H. Pham
*Assistant Examiner*—William Luther
*Attorney, Agent, or Firm*—Banner & Witcoff, Ltd.

[57] ABSTRACT

A communication device (1) for computer local networks of the cordless type uses a modulator (MOD) able to perform FSK modulation on the data (DDI) to be transmitted, with optimum characteristics thanks to a digital switch (SW) controlled by the data (DDI) which commutes during transmission between two fixed frequencies received from a quartz oscillator, in association with a filter of the surface acoustic wave type (SAW). The device (1) permits a significant improvement in circuit integration and is simple and of low cost.

23 Claims, 4 Drawing Sheets

FSK COMMUNICATION DEVICE FOR DIGITAL INFORMATION

FIELD OF THE INVENTION

The present invention relates to communication devices used to connect computers, for example personal computers, in networks. This device performs the function of an interface between the computer and the communication channel utilised for the network. This channel can be a physical channel, for example a coaxial cable or an optical fibre, or space in the case of the so-called wire less or cordless type of network in which the communication takes place by means of radio waves.

BACKGROUND ART

A device of this kind, known in the art, is disclosed for example in U.S. Pat. No. 9,682,344.

The device according to the present invention has been developed particularly, although not exclusively, for use in cordless local area networks, and in the specific embodiment to operate according to the ETS 300-175 standard.

Communication devices of the said type are known in the art, however they have one or more disadvantages such as, for example, sensitivity to disturbances, high cost, circuit complexity and others.

SUMMARY OF THE INVENTION

The object of the present invention is that of providing a simpler and less expensive communication device than the prior art devices whilst providing optimum performance.

According to the present invention this object is achieved by a communication device having the characteristics indicated in the claims which follow the present description.

BRIEF DESCRIPTION OF THE DRAWINGS

Further advantages and characteristics of the present invention will become apparent from the following detailed description, in which reference is made to the attached drawings, provided purely by way of non-limitative example, in which.

DESCRIPTION OF THE PREFERRED EMBODIMENT

Figure 1:
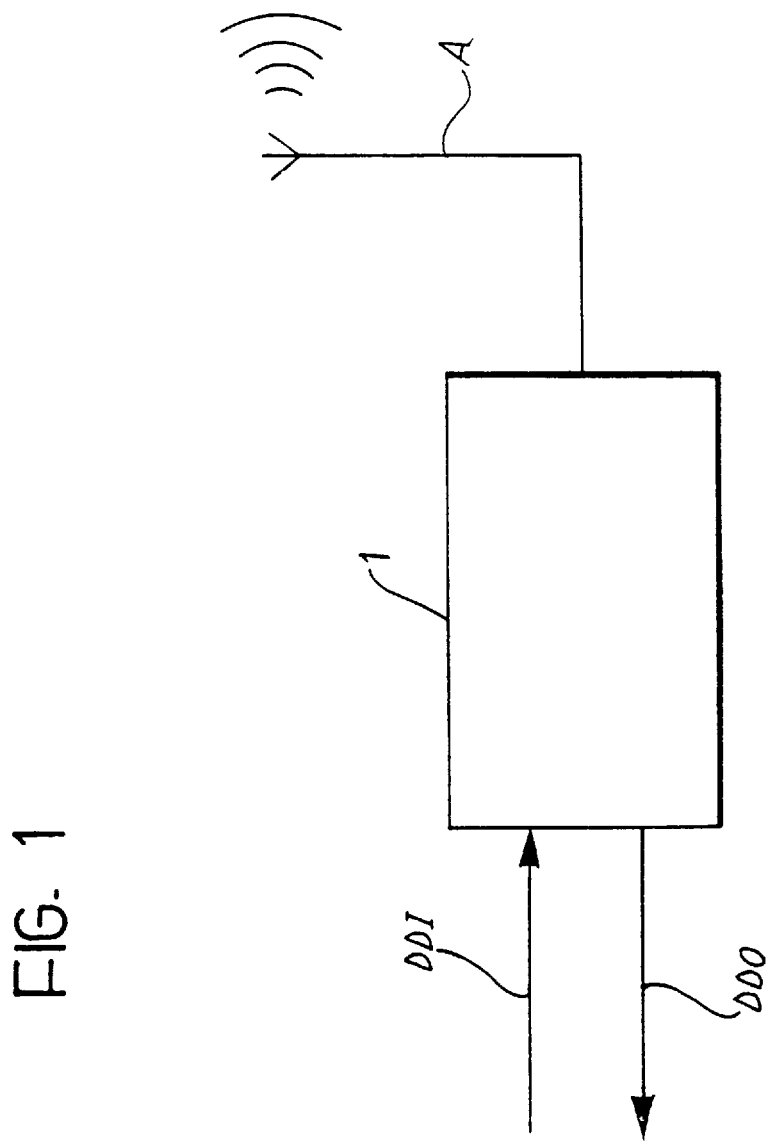
FIG. 1 schematically illustrates a communication device for computer networks.

In FIG. 1 is shown a generic communication device of the type described hereinabove. The device 1 communicates, via a digital communication channel of a type which is widely known, with a computer not illustrated. This channel is bi-directional such that it allows the transmission of input digital data, indicated DDI from the computer to the device 1 and the transmission of output digital data, indicated DDO from the device 1 to the computer.

The device communicates with other identical or compatible devices, still in a bi-directional manner, by means of radio waves using an antenna A.

In a possible embodiment it may be found convenient to use two antenna so as to be able to exploit the technology know as "space diversity".

Figure 2:
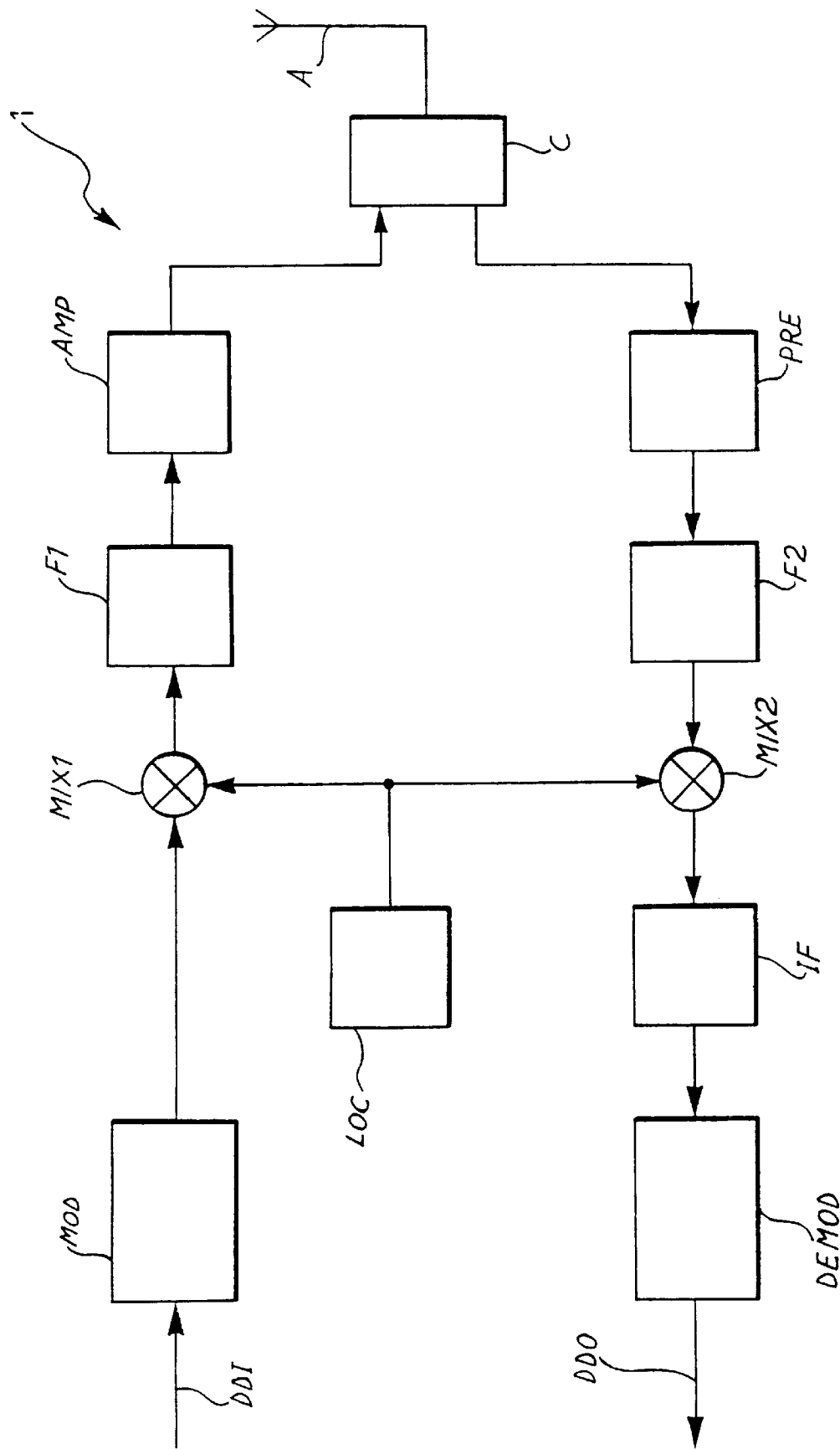
FIG. 2 is a block schematic diagram of an embodiment of the device according to the present invention.

In FIG. 2 is shown the high level architecture of an embodiment of the device 1 according to the present invention.

The input digital data DDI constitutes the input of a modulator, indicated MOD, which generates a modulated signal at its output. This modulated signal enters a mixer MIX1 which raises its frequency by utilising a fixed frequency signal produced by a local oscillator LOC. The high frequency modulated signal at the output from the mixer MIX1 then passes through a ceramic filter F1 after which it is amplified by the power amplifier AMP.

The amplified signal is sent to a commutation unit, indicated C, which sends it to an antenna A through which the signal is thus transmitted via radio.

What has been just described is the transmitter section of the device 1, the receiver section is similar, having a complementary structure. The radio signals received by the antenna A are sent via the commutation unit C to a receiver preamplifier indicated PRE. The received signals, thus preamplified, pass through a ceramic filter F2 and are applied to the input of a mixer MIX2. In the mixer MIX2 the signals are converted to a lower frequency by utilising the same local oscillator LOC as was used in the transmitter section.

The output signals from the mixer MIX2 are intermediate frequency signals; these are sent to a unit for conversion to low frequency, indicated IF. The low frequency signals at the output from the unit IF are sent to a demodulator indicated DEMOD which decodes them and emits at its output the output digital data DDO which can be sent to the computer connected to the device 1.

Figure 3:
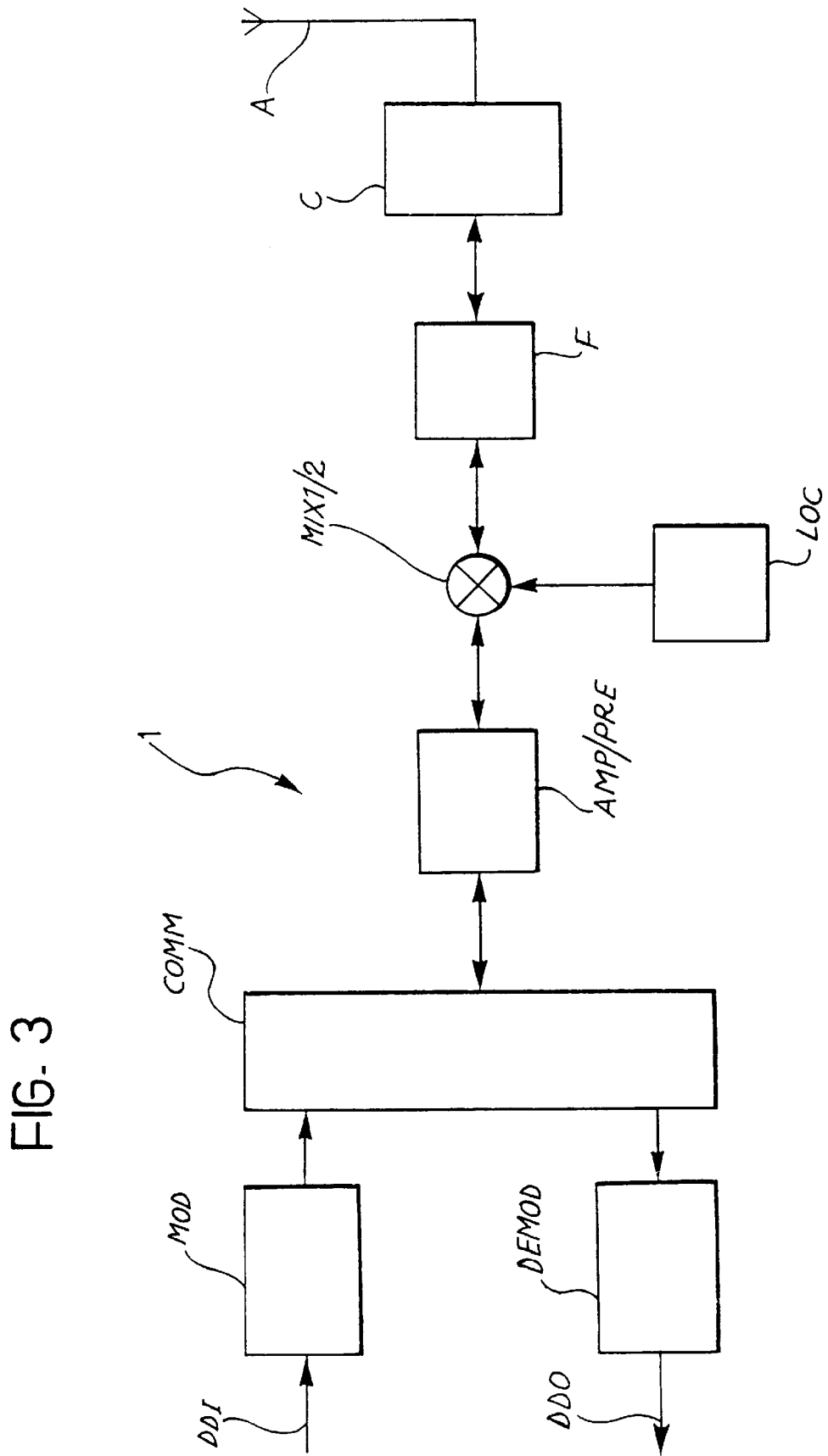
FIG. 3 is a block schematic diagram of an alternative embodiment of the device according to the present invention.

This architecture can be simplified, thereby reducing its cost and complexity, by making some of the elements of the communication device 1 bi-directional. A possible architecture simplified in this way is illustrated in FIG. 3.

A first element which can be made bi-directional is the amplifier AMP. In this way it is possible to integrate into a single bi-directional circuit the transmitter power amplifier AMP and the receiver input preamplifier PRE. The resulting circuit is a bi-directional amplifier indicated AMP/PRE. The bi-directional amplifier AMP/PRE is typically provided with filters, not illustrated in the drawings.

Consequent on the integration of the amplifier AMP/PRE it is possible also to integrate the transmitter ceramic filters F1 and receiver filters F2 into a single bi-directional filter F.

Moreover it is possible also to make the two frequency conversion mixers, namely the transmitter mixer MIX1 and the receiver mixer MIX2 bi-directional by integrating them into a single bi-directional mixer MIX1/2. The bi-directional mixer MIX1/2 still uses the local oscillator LOC for frequency conversion.

The arrangement of the elements varies slightly, as illustrated in FIG. 3, since the amplifier AMP/PRE is situated between the mixer MIX1/2, and the modulator MOD and the demodulator DEMOD.

Naturally, since the amplifier AMP/PRE is bi-directional it is necessary to introduce a connection circuit COMM for connecting it to the modulator MOD and demodulator DEMOD.

The bidirectionally of the device 1 can be accentuated greatly by also partly integrating the modulator MOD and the demodulator DEMOD for the purpose of utilising, for example, a single filter instead of two, as will be described below.

However, in the typical case in which the major part of the electronic circuit of the device 1 is made in integrated form it is necessary to evaluate carefully, in dependence on the specific embodiment, whether or not it is appropriate to make given components bi-directional.

In fact the additional cost of a mixer or an amplifier in integrated from can be negligible.

Figure 4:
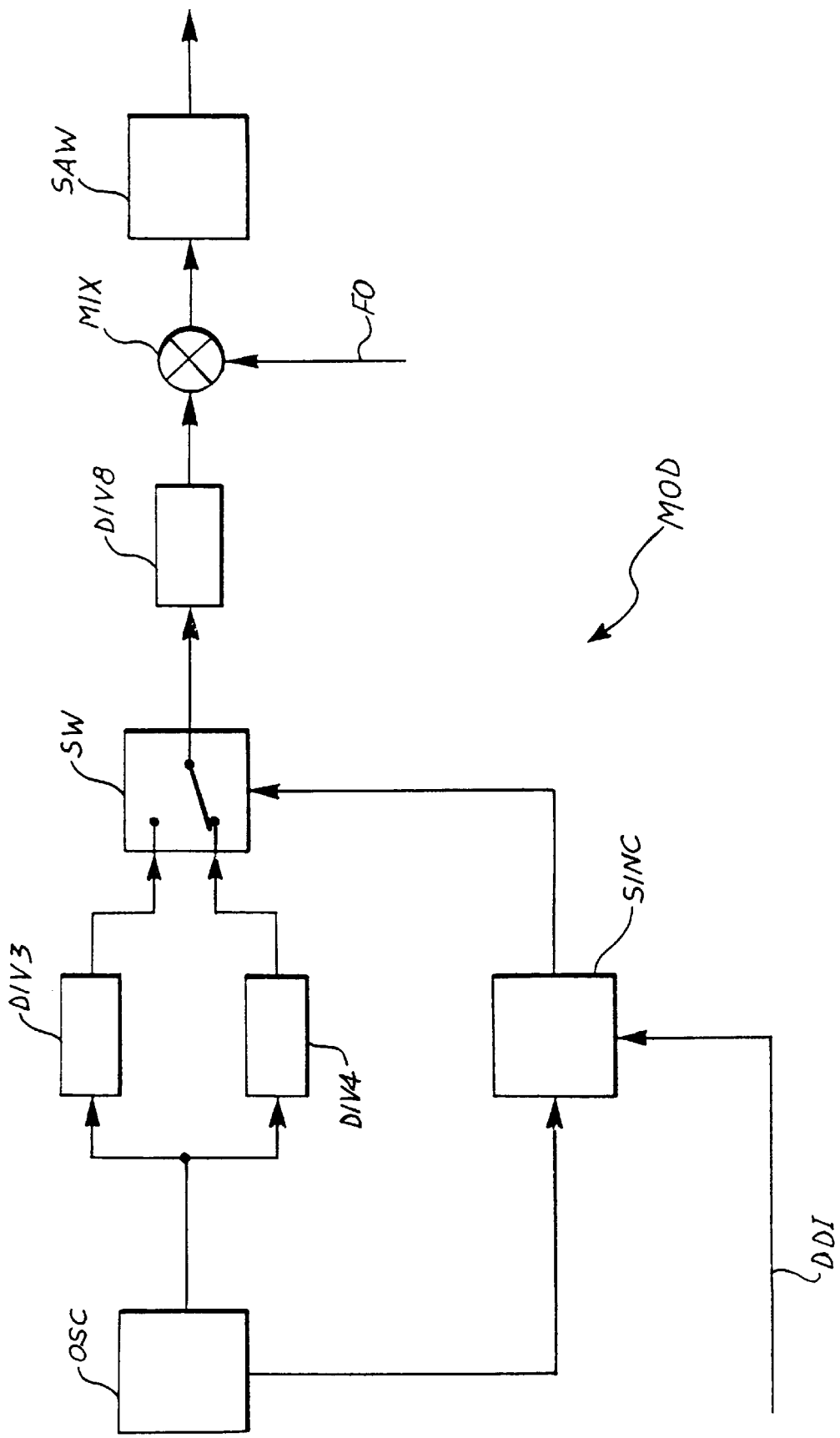
FIG. 4 is a block schematic diagram of a portion of the device shown in FIGS. 2 and 3.

A particularly important component of the device 1 is the modulator MOD which will now be described in detail making reference to FIG. 4.

The modulator MOD comprises a main oscillator indicated OSC which is the main (or master) fixed frequency oscillator. In the specific embodiment this frequency lies between 55 to 100 MHz although this can be varied in dependence on the particular design of the modulator MOD. The main oscillator OSC is a high quality oscillator, for example a quartz oscillator, since it must be very stable. Typically it is a digital oscillator and therefore the output signal from the master oscillator OSC is a square wave.

The output frequency from the main oscillator OSC constitutes the input to two divider circuits DIV3 and DIV4; DIV3 is a modulo 3 divider and DIV4 is a modulo 4 divider. The dividers DIV3 and DIV4 are also digital circuits.

The output signals from the dividers DIV3 and DIV4, that is to say signals having frequencies equal respectively to a third and a quarter of the frequency of the main oscillator OSC, are selectively connected to the input of a further modulo 8 divider DIV8 by a switch SW. This switch SW is also a digital circuit and is controlled by the digital input signals DDI which in the specific embodiment have a frequency of 576 KHz (or 1152 Kbit per second).

This configuration makes it possible to effect a modulation of the FSK (frequency shift keying) type. At the output of the divider DIV8 there therefore appears a modulated signal of the pure FSK type, centred on the mean of the frequency of the main oscillator OSC divided by 24 or by 32, that is to say divided by 8×3 or by 8×4. Therefore this PURE FSK signal is centred on a frequency which in the specific embodiment lies between 2 and 6 MHz.

The choice of the frequency generated by the main oscillator OSC is determined by the frequency desired in the specific case, lying between 2 and 6 MHz, for the modulated FSK signal. The modulo 8 divider DIV8 has the function of cleaning the signal at the output of the switch SW of harmonics at unwanted frequencies produced by the lack of synchronization between the frequency generated by the main oscillator OSC, and therefore the output frequency from the dividers DIV3 and DIV4, and the flow of data DDI which controls the switch SW.

If the flow of data which controls the switch SW is synchronized, by means of a synchronization circuit SINC, with the frequency generated by the main oscillator OSC the output signal from the switch SW is very much cleaner of unwanted harmonics. In this case it is therefore possible to avoid the use of the modulo 8 divider DIV8 and consequently the frequency generated by the main oscillator OSC can be reduced by a corresponding factor.

The output signal from the switch SW or possibly from the divider DIV8 is applied to the input of a mixer MIX in which the frequency is raised to 57 MHz, in the specific embodiment by means of a fixed frequency signal FO. The frequency FO can be produced by a dedicated oscillator or derived in a known way from other frequencies generated in the device 1.

The mixer MIX is also a digital circuit, and can therefore be formed as a simple logic port or gate in a simple and inexpensive manner. At the output of the mixer MIX appears a square wave digital signal at a frequency of 57 MHz with a very precise FSK deviation. This signal however is spectrally very dirty and it is therefore necessary to filter it.

The output signal from the mixer MIX than passes through a filter of surface-acoustic-wave type indicated SAW, which is a passive filter used in the radio field.

The output signal from the SAW filter is the signal generated by the modulator MOD.

The advantage of this system lies in the ease with which the power spectrum is thoroughly filtered. In other systems according to the prior art the filtering is extremely critical and in general does not give good results. With the system according to the invention on the other hand the filtering is very simple, gives optimum results, and can be achieved by means of an SAW filter. The saw filter is the same filter as is utilised to filter the intermediate frequency during the reception phase. This, too, is a very important point; that is to say the same filter is utilised in reception. With this system there is the advantage of saving filters, which are the most expensive elements in the system, in that the same filters can be used both for reception and transmission. The rest of the modulator moreover is extremely simple since it involves only a completely digital circuit. The master oscillator is also a square wave digital oscillator.

A further significant advantage of the system is given by the modulation of power developed in a manner implicit by the filter SAW. Networks of this type operate in TDD (time division duplex) or else in TDMA (time division multiple access). That is to say the radio does not transmit for 100% of the time but transmits only for limited time periods. This means that the transmitter is turned on and off.

The problem is that if the transmitter is turned on and off sharply, that is to say in practice with a square wave power variation in time, there is a spurious harmonic emission at the moment it is turned on or off.

The spurious harmonic emission is damaging in that it could disturb other users of the system. It is therefore necessary to modulate the power emitted by the transmitter in such a way that variation is not a square wave variation but that the transmitter is turned on and off in a gradual or smoother manner.

However this is very difficult since the transmitter is a non-linear element, and it is therefore rather complicated to reconcile this characteristic with other characteristics of the transmitter. Principally it is practically impossible to construct a transmitter the transmission power of which can be modulated, and which at the same time can jump quickly from one channel to the other. In particular these two characteristics are both very useful and the prior art has not succeeded in combining them in the same transmitter.

In fact prior art transmitters cannot change quickly from one channel to the other to the extent that, in certain cases, the solution has been adopted of having two synthesizers which serve the purpose since, whilst one is transmitting in one time slot the other is changing channel to arrive at the right channel to be able to transmit in the next time slot.

In the case of the present invention one the other hand the transmitter is non-linear and not modulated and therefore can change quickly from one channel to the other whilst still being inexpensive and simple. This is a significant advantage.

This is possible because the SAW filter adopted makes it possible to achieve a precise control of the spectral form, it is therefore possible to design the SAW filter in such a way that the harmonics generated by its time response to a pulse is below the limits envisaged by any standard. This obviates the necessity for power control since the shaping, that is to say the forming in time, is done automatically by the filter SAW, namely by a passive element. This is of very low cost and is very advantageous. The SAW technology filter has not been chosen only for this, but also for other reasons in that it is the best technology in cases such as this, the most economical and precise, and the least bulky.

The SAW filter is therefore designed not only to have the optimum output spectrum but also to shape the power variation during transmission, that is to say for eliminating unwanted transmission harmonics.

In this system there is the advantage that the number of components for the 2 GHz part is minimised thereby reducing cost and size. In systems in which space is not a problem it is possible to make the 2 GHz filters in the form of passive filters, made simply by tracks on a printed circuit, at a cost which is therefore absolutely insignificant. Alternatively ceramic filters are used.

Naturally, the principle of the invention remaining the same, the details of construction and the embodiments can be widely varied with respect to what has been described and illustrated, without by this departing from the ambit of the present invention.

We claim:

1. A FSK communication device (1) for digital information adapted to be used in association with a computer apparatus which generates coded input signals (DD1), the said device comprising:

modulator means (MOD) for receiving and modulating said coded input signals (DD1) at their input and generating first output signals derived from the said coded input signals (DD1);

transmitter means (MIX1, F1, AMP, C, A) for receiving the said first output signals and generating transmission signals from the said first output signals, capable of being received by a further communication device compatible with the said communication device (1), characterized in that the said modulator means (MOD) comprise:

oscillator means (OSC) for emitting a first synchronization signal having a fixed frequency;

at least two divider means (DIV3, DIV4) receiving the said first synchronization signal at their input and emitting at least two output synchronization signals having each one a frequency equal to said fixed frequency divided by a predetermined numerical factor, the numerical factors of the said at least two divider means (DIV3, DIV4) being different from one another;

commutation means (SW), connected to said at least two divider means (DIV3, DIV4), for receiving the said at least two output synchronization signals, and to said computer apparatus for receiving the said coded input signals (DD1) and emitting a first modulated output signal or a second modulated output signal, each of the said modulated output signals for a time period determined by the said coded input signals (DD1);

mixer means (MIX) connected to the said commutation means (SW) and to a source of a first predetermined periodic signal (FO) for emitting at least a modulated digital signal at a predetermined frequency with a predetermined "FSK" deviation and said predetermined periodic signal (FO); and filter means (SAW) connected to said mixer means (MIX) for filtering said modulated digital signal, locking said predetermined periodic signal (FO), and emitting said first output signals from the said modulator means (MOD).

2. A device (1) according to claim 1, characterized in that the said modulator means (MOD) further include divider means (DIV8) having an input connected to the output of the said commutation means (SW) and an output connected to the said mixer means (MIX), operable to divide the frequency of the said first or second modulated output signal by a further numerical factor.

3. A device (1) according to claim 1, characterised in that there are two said at least two divider means (DIV3, DIV4) the corresponding numerical coefficients of which are 3 and 4.

4. A device (1) according to claim 2, characterised in that the numerical coefficient of the said further divider means (DIV8) is 8.

5. A device (1) according to claim 1 and 2, characterised in that the said at least two divider means (DIV3, DIV4) and the said further divider means (DIV8) are frequency divider circuits.

6. A device (1) according to claim 3, characterised in that the said frequency divider circuits (DIV3, DIV4, DIV8) are digital circuits.

7. A device (1) according to claim 1, characterised in that the said commutation means (SW) comprise a multiplexer.

8. A device (1) according to claim 7, characterised in that the said multiplexer (SW) is a digital circuit.

9. A device (1) according to claim 1 and 7 or 8, characterised in that the said coded input signals (DD1) are coded digital signals, and in that the selection of the input of the said multiplexer (SW) for connection to the output takes place on the basis of the said coded digital signals.

10. A device (1) according to claim 9, characterised in that the said coded digital signals are binary coded signals having first and second logic values, and in that the said multiplexer (SW) connects a first input to its output upon reception of the said first logic value, and connects a second input to the output upon reception of the said second logic value respectively.

11. A device (1) according to claim 1, characterized in that the said filter means (SAW) comprise a passive filter.

12. A device (1) according to claim 11, characterised in that the said passive filter (SAW) is a surface acoustic wave filter.

13. A device (1) according to claim 1, characterised in that the said mixer means (MIX) are a circuit of the mixer type.

14. A device (1) according to claim 13, characterised in that the said mixer circuit (MIX) is a digital circuit.

15. A device (1) according to claim 1, characterized in that the said first synchronization signal and the said first modulated output signal are square wave signals.

16. A device (1) according to claim 1, characterized in that the said first modulated output signal at the input to the said mixer means (MIX) has a mean frequency lying between 2 and 6 MHZ.

17. A device (1) according to claim 1, characterized in that the said modulated digital signal has a frequency of the order of 57 MHZ.

18. A device (1) according to claim 1, characterised in that it comprises:

receiver means (IF, MIX2, F2, PRE, C, A) receiving input signals emitted from a compatible communication device operable to generate first input signals at its output, and demodulator means (DEMOD) receiving the said first input signals at its input and operable to generate at its output coded output signals (DDO) to be sent to the said computer apparatus.

19. A device (1) according to claim 1 characterized in that the said transmission means (MIX, F1, AMP, C, A) include:

first mixer means (MIX1) for receiving at its input the said first output signal and a second, fixed frequency periodic signal (LOC), and operable to raise the frequency of the said first output signals, first filter means (F1) operable to filter the said raised-frequency first output signals, first amplifier means (AMP) for receiving at its input the said raised-frequency first output signals from the said first filter means (F1), and operable to emit first power signals at its output, and connection means (C) operable to send the said first power signal to at least one antenna (A).

20. A device (1) according to claim 18, characterized in that the said receiver means comprise:

connection means (C) operable to receive the said input signals from at least one antenna (A), and to emit them at its output, second amplifier means (PRE) for receiving the said input signals at its input, and operable to emit second power signals at its output, second filter means (F2) operable to filter the said second power signals, second mixer means (MIX2) for receiving at its input the said second power signals and a second fixed frequency periodic signal (LOC), and operable to reduce the frequency of the said second power signals and to generate at its output the said first input signals to send to the said demodulator means (DEMOD).

21. A device (1) according to claim 19 and 20, characterised in that the said first (MIX1) and the said second (MIX2) mixer means are integrated in a single bi-directional mixer circuit (MIX1/2).

22. A device (1) according to claim 19 and 20, characterised in that the said first (AMP) and the said second (PRE) amplifier means are integrated in a single bi-directional amplifier circuit (AMP/PRE).

23. A device (1) according to claim 19 and 20, characterised in that the said first (F1) and second (F2) filter means are integrated into a single bi-directional filter (F).

* * * * *